United States Patent
Brockmann

(10) Patent No.: US 11,732,949 B2
(45) Date of Patent: Aug. 22, 2023

(54) APPARATUS FOR COOLING HIGH-HEAT-TREATED FOOD PRODUCTS, METHOD FOR PERFORMING THIS, AND HEAT-TREATMENT LINE FOR THIS

(71) Applicant: Stephan Machinery GmbH, Hameln (DE)

(72) Inventor: Gerhard Brockmann, Aerzen (DE)

(73) Assignee: STEPHAN MACHINERY GMBH, Hameln (DE)

( * ) Notice: Subject to any disclaimer, the term of this patent is extended or adjusted under 35 U.S.C. 154(b) by 197 days.

(21) Appl. No.: 16/781,612

(22) Filed: Feb. 4, 2020

(65) Prior Publication Data
US 2020/0248948 A1    Aug. 6, 2020

(30) Foreign Application Priority Data
Feb. 4, 2019   (DE) .................... 20 2019 000 491.2

(51) Int. Cl.
*A23C 3/04*      (2006.01)
*F25D 23/06*     (2006.01)
*F25D 17/02*     (2006.01)
*F25D 13/00*     (2006.01)
*A01J 25/13*     (2006.01)

(52) U.S. Cl.
CPC .............. *F25D 13/00* (2013.01); *A01J 25/13* (2013.01); *A23C 3/04* (2013.01); *F25D 17/02* (2013.01); *F25D 23/061* (2013.01); *F25D 2400/28* (2013.01)

(58) Field of Classification Search
CPC ........ F25D 13/00; F25D 31/002; F25D 17/02; F25D 23/061; F25D 2400/28; A01J 9/04; A01J 25/005; A01J 25/002; A23C 3/04; A23C 19/024; A23C 9/1223; B01F 2035/98
See application file for complete search history.

(56) References Cited

U.S. PATENT DOCUMENTS

2011/0256288 A1* 10/2011 Isenberg ................. A23L 3/001
                                                              426/520

FOREIGN PATENT DOCUMENTS

EP           0499041       *  8/1992   .......... B01F 3/04588

* cited by examiner

*Primary Examiner* — Cassey D Bauer
(74) *Attorney, Agent, or Firm* — Michele V. Frank; Venable LLP

(57) ABSTRACT

The invention relates to an apparatus for cooling high-heat-treated food products with a flash-cooler, having a container for a pre-product to be cooled with an inlet for the pre-product to be cooled and an outlet for the cooled end product of the food product as well as cooling equipment, the cooling equipment having a cooling jacket associated to the container, through which at least one part of the wall of the container is cooled. The invention also relates to a heat-treatment line for food products, having one such apparatus. The invention also relates to a method for cooling high-heat-treated, particularly ultra-high-heat-treated food products, using a flash cooler having a container for a pre-product to be cooled, with an inlet for the pre-product to be cooled and an outlet for the cooled end product of the food product and cooling equipment.

9 Claims, 5 Drawing Sheets

Figure 1:
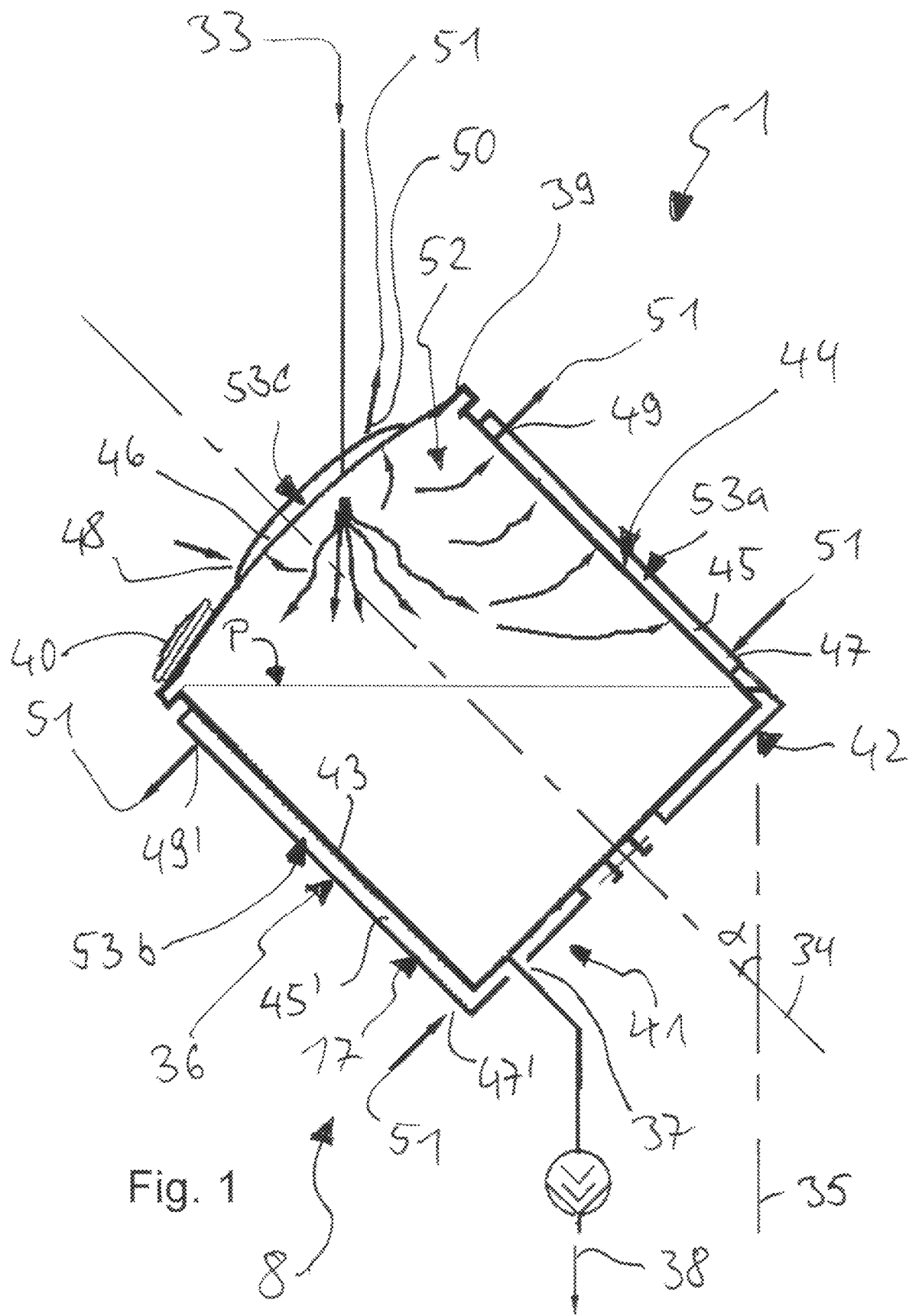

APPARATUS FOR COOLING HIGH-HEAT-TREATED FOOD PRODUCTS, METHOD FOR PERFORMING THIS, AND HEAT-TREATMENT LINE FOR THIS

The invention relates to an apparatus for cooling high-heat-treated, particularly ultra-high heat-treated food products or foods according to the preamble of claim 1 and a heat-treatment line equipped with such an apparatus. Also falling within the scope of the invention and disclosed here is a corresponding method for cooling ultra-high heat-treated food products, especially in a heat-treatment line.

Continuous heat-treatment lines 2 using an apparatus 1 of this type are known in practice for cooling high-heat-treated food products, for example soft cheese or a food product in general. A heat-treatment line 2 with a throughput of up to 1000 kg/h, shown in FIG. 3 as an example, is made up of at least one precooker (two precookers 3a and 3b are present in the example shown in FIG. 3), a buffering container 4 with an evacuation pump 5, a heat-treatment system 6 with, in the example of FIG. 3, two heat-treatment sections 7a and 7b, a flash cooler 8, an optional creaming apparatus 9, which may be integrated in the flash cooler 8 as in the example shown in FIG. 3, generally in the following as a filtering station (e.g., with a double filter) and filling device 10.

The two precookers 3a and 3b operate alternately in batch operation. After one precooker 3a or 3b is filled with food product raw material 11, grinding, mixing and preheating to a temperature of up to 95° C. is conducted there to obtain an intermediate product 12 of the food product. Each precooker 3a and 3b empties the pre-product 12 into the buffering container 4, and the evacuation pump 5 thereof delivers the pre-product 12 obtained from the precooker 3a and 3b continuously and successively through the heat-treatment system or the heat-treatment equipment or generally the heat-treatment unit 6 and the flash cooler 8 as well as the creaming apparatus 9 to the filter station (e.g., with a double filter) and the filling device 10. In the heat-treatment system 6 the pre-product 12 is high-heat-treated to, for example, 145° C. and sterilized, for example using one ultra-high temperature head 13a and 13b per heat treatment section 7a or 7b, forming the pre-product 14 of the food product treated up to this point. Insofar as the temperature for high or ultra-high treatment has not been reached, inadequately sterilized components 15 are filtered out and conducted into a residual material container 16. In the next container 17 of the combined flash cooler 8 and creaming apparatus 9 in the present example, the pre-product 14 is cooled over a vacuum cooling system 18 to a filling temperature of, for example, 80-90° C. and depending on the desired properties of the end product 19 of the food product, may sometimes be creamed, i.e., the viscosity desired for the end product 19 is established. The type and intensity of the creaming effect can be influenced via the rotation speed of the creaming implement 20 of the creaming apparatus 9 and the filling level in container 17.

Figure 3:
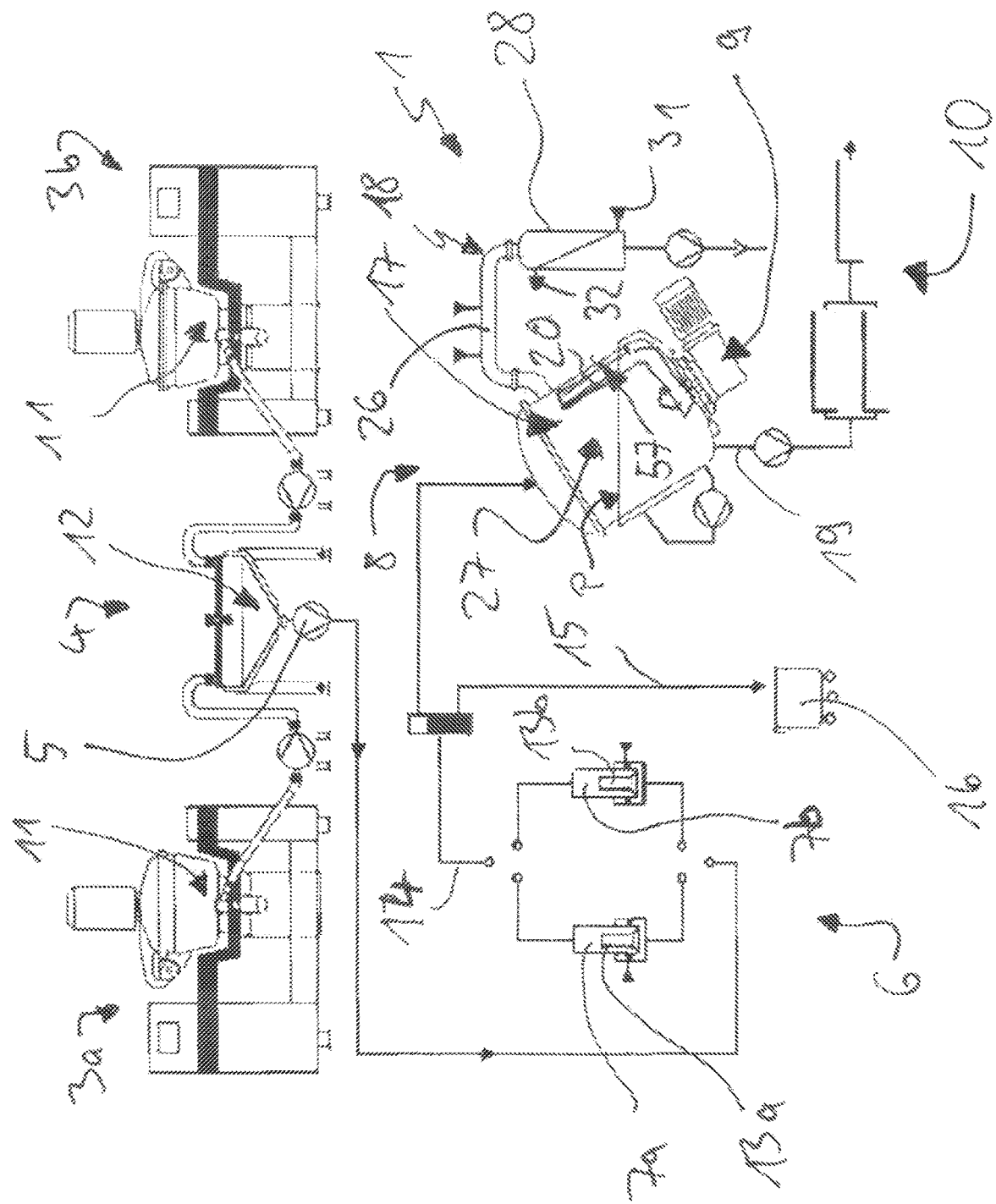
Figure 4:
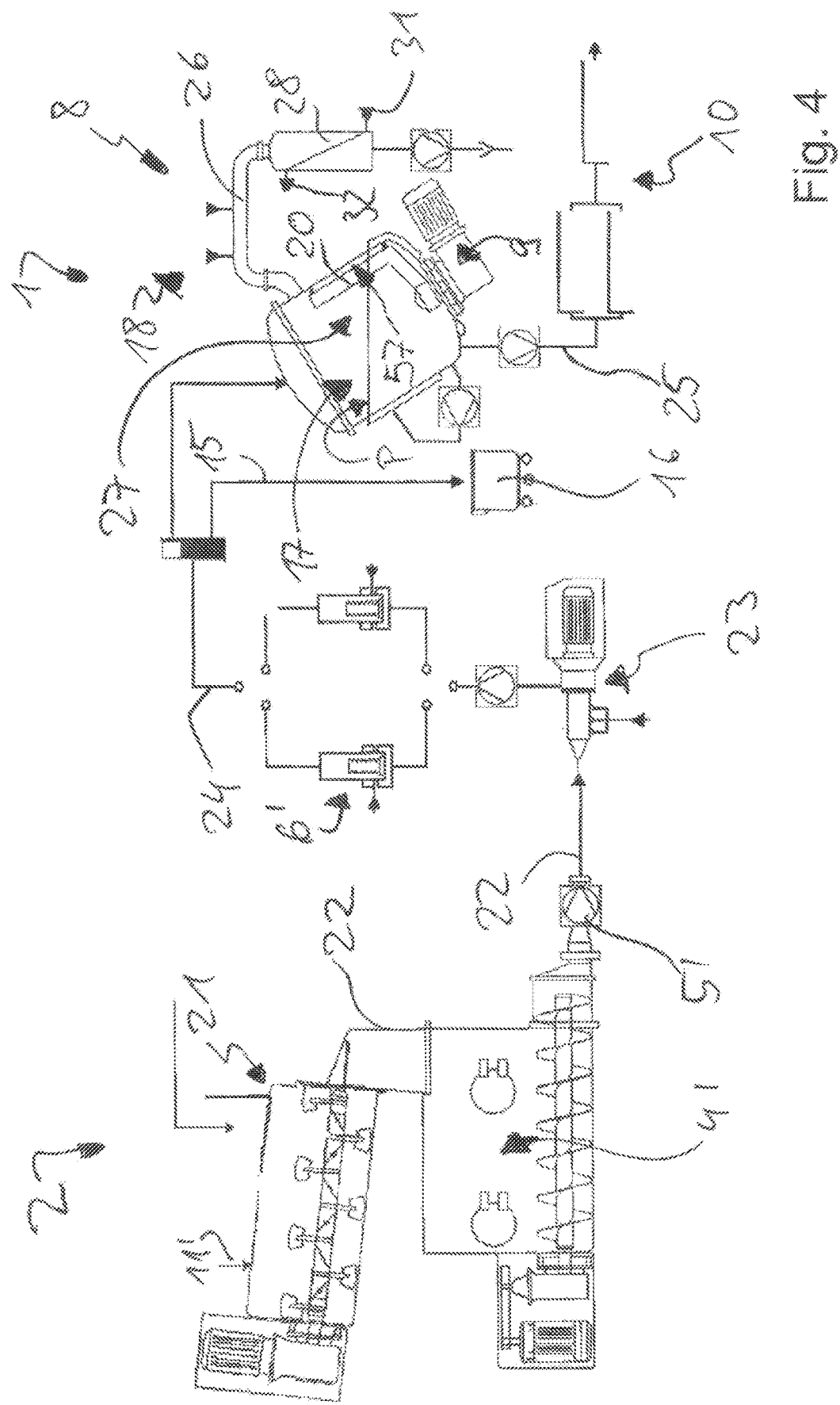

In a high-throughput (more than 1000 kg/h) heat-treatment line 2' known from practical use, as shown in FIG. 4 as an example, the pre-comminuted (e.g., using a passing machine), raw materials 11' of the food product are homogeneously mixed with additional formula components (water, flavorings, emulsifying salt, etc.) in a premixer 21 and evacuated into a buffering container 4'. The evacuation pump 5' used delivers the mixed pre-product 22 of the food product continuously into a Continuous Cooker 23 serving as a precooker 3, where preheating to as much as 95° C. and further homogenization using an appropriate tool set takes place, and then through the heat-treatment equipment 6' to obtain the pre-product 24, as was previously described in connection with FIG. 3, and with all appropriate measures and effects applying here as well. In the flash cooler and creaming container 17 of the combined flash cooler 8 and creaming apparatus 9 that follow, the pre-product 24 of the food product is cooled to the filling temperature using a vacuum cooling system 18, and depending on the desired properties of the end product 25 of the food product, in some cases it may be creamed, i.e., the desired viscosity for the end product 25 built up. The nature and intensity of the creaming effect may be altered by way of the rotation speed of a creaming device 20 of the creaming apparatus 9 and the filling level in container 17.

Using flash cooler 8 and creaming apparatus 9, apparatus 1 for cooling high-heat-treated food products known from practical use may also be conducted separately in two different containers (not shown).

Figure 5:
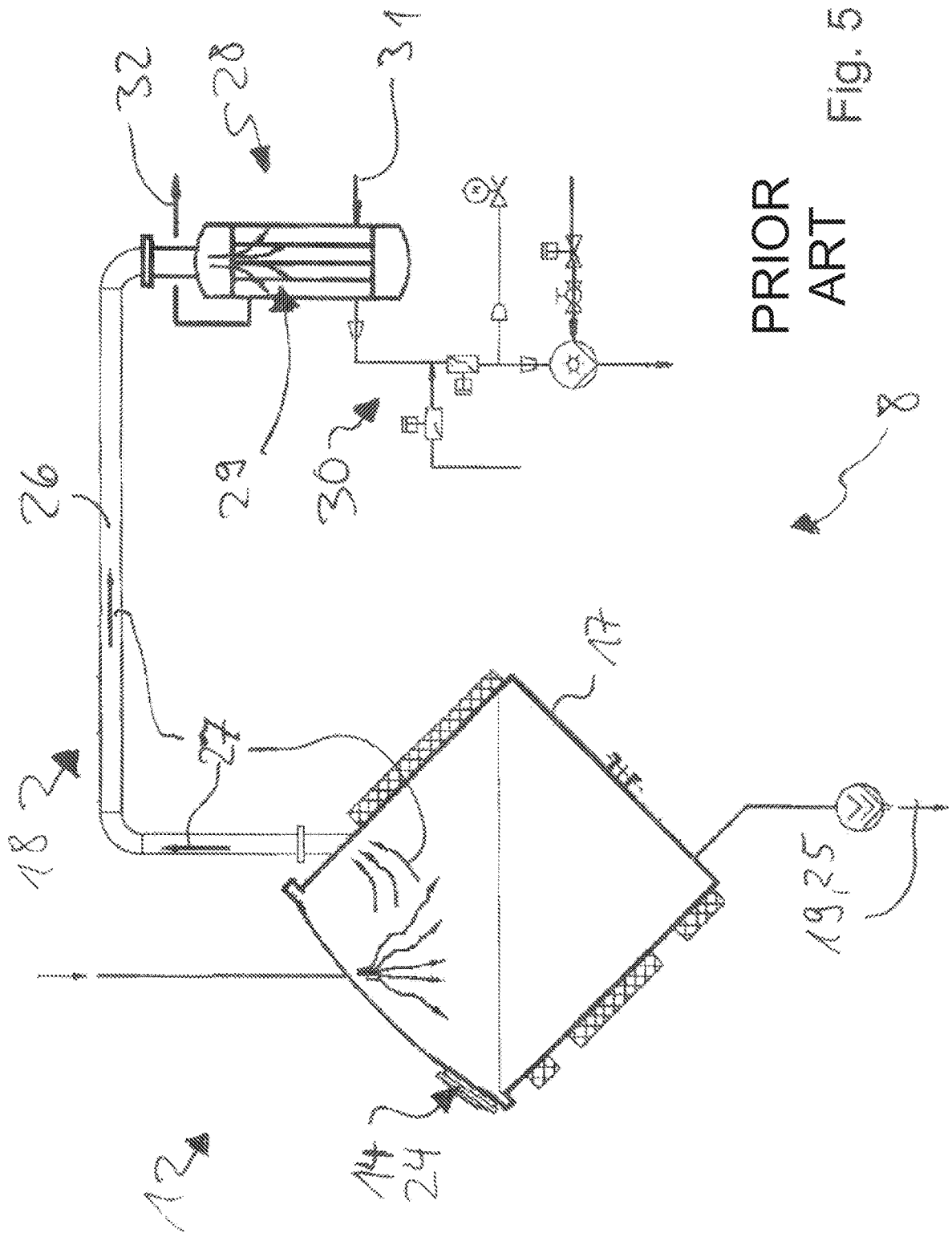

To explain the design of the apparatus 1 for cooling of high-heat-treated food products in a heat-treatment line, known from practical use, an apparatus 1 of this type is shown in enlarged view in FIG. 5, wherein for the sake of simplicity and because this does not contribute anything to the basic design of the flash cooler 8, a combination creaming apparatus 9 was omitted.

The apparatus 1 for cooling high-heat-treated food products in a heat-treatment line shown as an example in FIG. 5 is called a flash cooler 8. This flash cooler 8, in addition to container 17, which is partly filled with the pre-product 14 or 24 during operation, has a condenser 26, through which the steam 27 formed from the pre-product 14 or 24 is conducted to a heat exchanger 28, from which the condensate 29 that forms is drawn off by a vacuum pump 30. The desired cooling of the high-heat-treated or ultra-high-heat-treated pre-products 14 or 24 from, for example, 95° C. or 145° C. to a required filling temperature of the end product 19 or 25 of generally 80-90° C. is accomplished by reducing the pressure and evaporating water from the pre-product 14 or 24. Here, the negative pressure is generated using a vacuum pump (not shown) and the resulting steam condensed in a heat exchanger 28, having a coolant inlet line 31 and a coolant outlet line 32. The steam formed in the container 17 of the flash cooler 8 from the pre-product 14 or 24 is thus deposited in the external heat exchanger or condenser 28, which is external to the container 17, and is then removed from the overall method.

Another drawback to this type of apparatus for cooling high-heat-treated food products in a heat-treatment line, in addition to the equipment cost for the external heat exchanger or condenser 28 and the operating cost thereof, is that the cooling of the pre-product in the container of the flash cooler is not optimal, since it is only generated using negative pressure.

The task of the present invention is to reduce or eliminate the drawbacks of the prior art.

The invention achieves this by means of an apparatus for cooling high-heat-treated food products according to claim 1 and a heat-treatment line equipped with this. The invention also offers solutions to the problem in the form of corresponding operating methods of an apparatus for cooling high-heat-treated food products according to claim 1 and a heat-treatment line equipped with this.

Specifically, the invention creates an apparatus for cooling high-heat-treated food products using a flash cooler having a container for an pre-product to be cooled, with an inlet for the pre-product to be cooled and an outlet for the cooled end product as well as cooling equipment, the cooling equipment having a cooling jacket associated with the container, through which at least part of the wall of the container is cooled.

Additionally it is stated that the pre-product supplied to the container has an inlet temperature T1 and the end product removed from the container has an outlet temperature T2, wherein T1>T2, defining the cooling.

Thus condensation of the steam from the intermediate product, having a cooling effect, takes place on at least one cooled part of the wall or internal surface of the container. The continuous cooling from 145° C. down to as low as 20° C. (in a soft cheese manufacturing method, generally down to 80° C. for the end product) still takes place by lowering the pressure and evaporating water from the pre-product. In the flash cooler or optionally flash cooler and creaming, the high-heat- or ultra-high-heat-treated pre-product (e.g., soft cheese) is cooled to a filling temperature of the end product of generally 80-90° C. and optionally creamed.

In contrast to the previous prior art, steam coming from the pre-product is not deposited externally in a heat exchanger or condenser, which means that the equipment and operating costs thereof can be economized upon, but due to the cooling jacket, is condensed directly in the container of the flash cooler and optionally the creaming apparatus at least on part of the interior surfaces of the container. The condensate formed contributes additionally to the cooling of the pre-product and thus to obtaining the end product with the desired discharge temperature. In particular, the condensate formed during the creaming method is mixed in, further improving the utilization of the condensate for cooling the pre-product and thus the attainment of the end product. Because the condensate remains in the product and is not carried away externally as in the prior art, the corresponding amount of water can be economized upon in the formula for achieving the desired end product. In addition, because the condensate is returned to the pre-product, flavor present in the condensate is retained in the method, which also leads to savings in the formula for achieving the desired end product.

The apparatus according to the invention for cooling high-heat-treated food products thus creates closed cooling or optionally closed cooling and creaming of high-heat-treated and particularly ultra-high-heat-treated food products.

Lowering the pressure in the container according to the invention is accomplished by condensation on the cooled or cold parts of the wall or inner surfaces of the container. In addition, such a lowering of the pressure can result in or aid in the removal of undesirable gases, for example air, by an external vacuum pump; this effect can also be planned and implemented, for example, for initiating the pressure reduction in the container and thus the cooling effect.

The container preferably contains a bowl with the outlet for the cooled end product and a lid to which the inlet for the pre-product to be cooled can be attached, and the cooling equipment is associated with both the bowl and the lid. This means that if necessary the cooling equipment can act not only on the steam from the pre-product, but also on the pre-product to be cooled itself.

Preferentially it can also be provided that the cooling jacket is formed by double walling at least one part or at least one part of the container or pillow plate.

Additional preferred embodiments consist of the fact that the cooling jacket is optionally ar-ranged or formed on the bowl and on the lid of the container, and/or that the cooling jacket has at least two cooling zones that can be operated individually.

Preferably additional cooling or temperature control of the product can take place by means of an additional double wall or cooling zone in the lower portion of the container below the product level.

The container may be set up vertically or at an angle to the vertical and may also be fitted with a stirrer if cooling and creaming is to take place in the container or without a stirrer if only cooling without creaming is to be done in the container.

Further optimization of condensation and thus performance can preferably be achieved using a power tool, for example an agitating arm or a mixing or creaming blade with at least one scraper. The scraper or scrapers continuously remove(s) condensate formed on the cooled or cold part of the wall of the inner surfaces of the container, thus preventing formation of a condensate film that re-duces heat transfer.

In addition the invention creates a method for cooling high-heat-treated, particularly ultra-high-heat-treated food products, using a flash cooler having a container for an pre-product to be cooled, with an inlet for the pre-product to be cooled and an outlet for the cooled end product of the food product as well as cooling equipment, wherein liquid evaporates from the pre-product and the heat is removed by condensation on the inner wall of the container.

Preferred and advantageous further developments of the method according to the invention are identified by the use of the preferred and/or advantageous embodiments of the corresponding apparatus explained in the preceding.

Additional preferred and/or advantageous embodiments of the invention and the details thereof result from combinations of individual claims and the entirety of the application documents provided.

Figure 2:
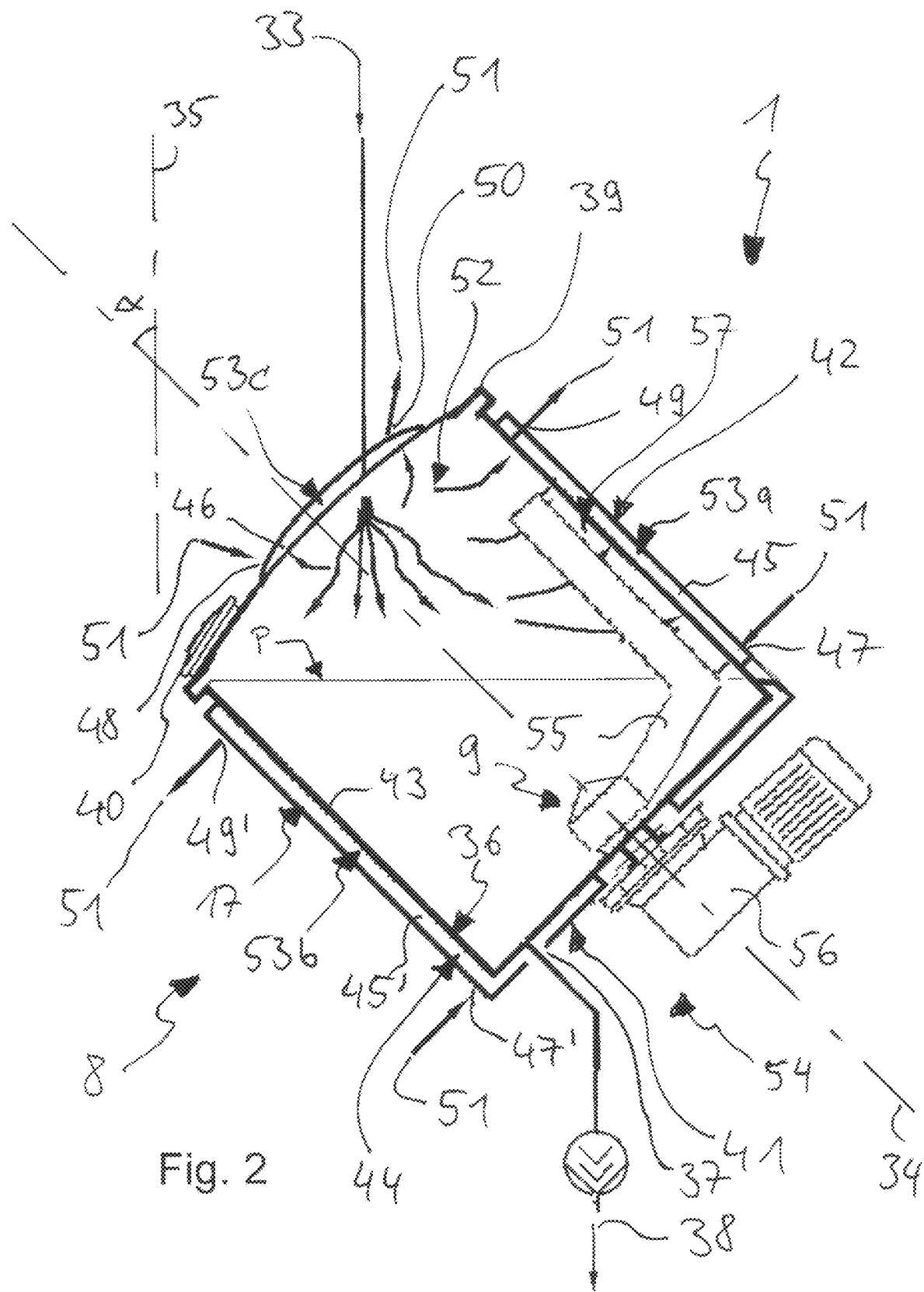

In the following, the invention will be explained based on exemplary embodiments, referring to the drawing merely as examples, wherein FIG. 1 illustrates a schematic sectional view of a first exemplary embodiment of an apparatus for cooling high-heat-treated food products, FIG. 2 illustrates a schematic sectional view of a second exemplary embodiment of an apparatus for cooling high-heat-treated food products, FIG. 3 illustrates a schematic sectional view of a first exemplary embodiment of a heat-treatment line with an apparatus for cooling of high-heat-treated food products according to the prior art, FIG. 4 illustrates a schematic sectional view of a second exemplary embodiment of a heat-treatment line with an apparatus for cooling of high-heat-treated food products according to the prior art, and FIG. 5 illustrates a schematic sectional detail view of the apparatus for cooling high-heat-treated food products according to the prior art.

Based on the embodiments and application examples described in the following and illustrated in the drawings, the invention will be further explained merely by way of example, i.e., it is not limited to these embodiments and application examples or to the combinations of features within an embodiment and application example. Method and apparatus features in each case also arise anal-ogously from descriptions of the apparatus and method.

Individual features described and/or illustrated in connection with a specific exemplary embodiment are not limited to this exemplary embodiment or the combination with the other features of this exemplary embodiment, but can be combined, within the scope of technical possibility, with any other variants, even if they are not discussed separately in the various documents.

The same reference symbols in the individual figures and illustrations within the drawings designate identical or similarly operating components. Based on the representations in the drawing, features not provided with reference symbols become clear, regardless of whether such features are described later or not. On the other hand, features that are present in the existing description but are not shown or illustrated in the drawing are easily understandable for a person skilled in the art.

In FIGS. 1 and 2 a first and a second exemplary embodiment of an apparatus 1 for cooling high-heat-treated food products are illustrated, in FIG. 1 without and in FIG. 2 with combined creaming, so that the identical features and designs are described in the following exemplary embodiments, referencing FIGS. 1 and 2.

The apparatus 1 for cooling high-heat-treated food products shown as examples in FIGS. 1 and 2 is particularly used in heat-treatment lines such as are known from the prior art and are illustrated in this context in FIGS. 3 and 4.

The apparatus 1 for cooling high-heat-treated food products according to FIGS. 1 and 2 is called a flash cooler 8. This flash cooler 8 has a container 17, which in operation is partly filled with a pre-product 33 of the food product. In the exemplary embodiments shown in FIGS. 1 and 2, the container 17 is cylindrical and is positioned at an angle α with the vertical, i.e., its cylinder axis 34 is positioned at an angle α to the vertical 35 different from 0° on the floor on which the apparatus 1 stands while in operation, but could also be positioned vertically without interfering with the fundamental features and effects of the invention. The said angle α between the cylinder axis of container 17 and the vertical is particularly 5° to 65°, preferably 15° to 55° and particularly preferably 25° to 45°. The container 17 of the first and seconds exemplary embodiments of the apparatus 1 for cooling high-heat-treated food products according to FIGS. 1 and 2 contains a bowl 36 with an outlet 37 for cooled end product 38 and a lid 39 with an inlet 40 for the pre-product 33 to be cooled.

The flash cooler 8 also has cooling equipment 41, including a cooling jacket 42 associated with the container 17. In the first and second exemplary embodiments of the apparatus 1 for cooling high-heat-treated food products according to FIGS. 1 and 2 the cooling jacket 42 is realized by a zoned double-wall design of the wall 43 in the form of a double wall 44 and the lid 39, so that hollow spaces 45, 45' and 46 are located in the wall 43 of the bowl 36 and in the lid 39. The hollow spaces 45, 45' and 46 are in fluid connection with inlets 47, 47' and 48 and outlets 49, 49' and 50 for coolant 51, so that the coolant 51 can flow through them, taking up or able to take up the heat from the wall 43 of the bowl 36 and the lid 39, and transporting it away. Expressed generally, the cooling jacket can be formed by a double wall 44 of at least one part or on at least one part of the container 17 or pillow plates.

The wall 43 of the bowl 36 and the lid 39 are on one hand heated by the pre-product 33 con-tained and steam 52 rising from it, and on the other hand draw heat from the pre-product 33 and steam 52 with heating of the coolant 51, so that the pre-product 33 and the steam 52 rising from it are cooled. This means that the cooling equipment 41 acts not only on the steam 52 from the pre-product 33, but also on the pre-product 33 to be cooled itself. Furthermore, the steam 52 from the pre-product 33 condenses on the cooling or cooled wall 43 of the bowl 36 and the cooling or cooled lid 39 and the condensate formed drops back into the pre-product 33, cooling it additionally as a result. The thermodynamic methods and effects of cooling as a whole are presumed to be familiar, so that it is not considered necessary to go into this in detail.

The zoned double-walled design of the wall 43 of the bowl 36 means that the cooling jacket 42 is formed by the double wall 44 of at least one part of the container 17. In the exemplary embodiments shown in FIGS. 1 and 2, the cooling jacket 42 is attached only, for example, to areas of the bowl 36 and the lid 39 of the container 17 but could also be provided for only one area or several areas of the bowl 36 or the lid 39 of the container 17. In addition, the cooling jacket 42 may have at least two separately operable cooling zones 53a, 53b and 53c, as is shown for example in the exemplary embodiments in den FIGS. 1 and 2 based on the three cooling zones 53a, 53b and 53c. Thus it is essential that at least one part of the wall 43 of the container 17 is cooled by the cooling jacket 42.

Preferably, additional cooling or temperature control of the product can take place through an additional double wall 44 or cooling zone in the bottom part of the container 17 below the product level P, i.e., the filling level or the existing level of the product content in the container 17.

Due to condensation on the cooled or cols part of the wall 43 or then inner surfaces of the container 17, reduction of the pressure in container 17 also takes place, and consequently, evapora-tion of water from the pre-product 33. Such a reduction of the pressure in container 17 can also be done or can be supported in order to remove undesirable gases, for example air, with an external vacuum pump (not shown).

The lowering of the pressure in container 17 thus takes place due to condensation on the cooled or cold part of the wall 43 or inner surfaces of the container 17. Such a reduction of the pressure in container 17 can also be done or can be supported in order to remove undesirable gases, for example air, with an external vacuum pump (not shown), which can also be provided and used for example for initiating lowering of the pressure in container 17 and thus also the cooling effect.

Once again, referring only to the second exemplary embodiment of the apparatus 1 for cooling high-heat-treated food products, shown in FIG. 2, by way of the features of the first exemplary embodiment of the apparatus 1 for cooling high-heat-treated food products without combined creaming shown in FIG. 1, a creaming apparatus 9 provided or integrated in container 17 may also be provided or integrated in the second exemplary embodiment. This creaming apparatus 9 contains a stirrer 54 with a stirring arm 55 as the creaming device 20 and a drive 56 for the latter. In this exemplary embodiment the stirring arm 55 when in operation particularly also provides for stirring in or mixing in the condensate that separates from the pre-product 33 on the cooling or cooled wall 43 of the bowl 36 and the cooling or cooled lid 39, which drops back into the pre-product 33, which is consequently additionally cooled and draws benefit for the end product 38 of the food product from the fluid fraction thus obtained and its flavor components.

Further optimization of condensation and thus performance can also preferably be achieved through a power tool, for example the stirrer arm 55 or a mixing or creaming blade with at least one scraper 57. The scraper or scrapers 57 continuously remove(s) the condensate formed on the cooled or cold part of the wall 43 or the inner surfaces of the container 17 and thus prevents formation of a condensate film, which would impede heat transfer.

Thus in terms of method, according to the invention an pre-product 33 is conveyed from a heat-treatment line to a flash cooler 8 and introduced directly into the container 17 thereof, to which the cooling equipment 41 is attached, so that the pre-product 33 and steam 52 rising from this are directly cooled in the container 17, so that condensate from the steam 52 condenses in the interior of the 17 at least on areas of the wall 43 and/or lid 39 thereof, and the condensate drops back into the pre-product 33, contributing to the cooling the flavor thereof.

In summary, some essential advantages of the invention compared with the initially discussed prior art are:

- low fluid consumption, for example water consumption, since the condensate remains in the product, as a result of which for example the water fraction of the formula can be reduced by the quantity of the condensate;
- lower "flavoring requirement", since the condensate and the aromatic and flavoring substances that it contains remain in the product, so that the "flavoring requirement" of the formula can be reduced;
- no condensate containing product constituents is removed, for example by way of the vacuum pump in the prior art, and must be disposed of;
- faster cleanup and lower cleaning agent consumption, since no cleaning of a separate, external condensing unit as in the prior art is necessary;
- lower material consumption, since in particular a condenser and corresponding piping etc. are not needed;
- smaller footprint of the unit.

Cooling condensation of the steam 52 from the pre-product 33 thus takes place according to the present invention on at least one cooled part of the wall 43 or inner surfaces of the container 17. The continuous cooling from especially 145° C. to as little as 20° C. (in the case of a soft cheese production method, generally down to 80° C. in the end product 38) is still accomplished by lowering the pressure and evaporating water from the pre-product 33. In the flash cooler 8 or the flash cooler 8 and the creaming apparatus 9, the high-heat-treated or ultra-high-heat-treated pre-product 33 (e.g., soft cheese) is cooled to a filling temperature of the end product 38 of generally 80-90° C. and optionally creamed. Thus the desired cooling of the high-heat-treated or ultra-high-heat-treated pre-product 33 from for example 95° C. or 145° C. to a required filling temperature of the end product 38 of generally 80-90° C., or even to a lower temperature, for example as low as 20° C., is accomplished.

Steam 52 arising from the pre-product 33 is condensed by the cooling jacket 42 directly in the container 17 of the flash cooler 8 and optionally the creaming apparatus 9 at least on one part of the wall 43 or inner surfaces of the container 17. The formation of the condensate additionally contributes to the cooling of the pre-product 33 and thus to achieving the end product 38 of the food product with the desired output temperature. In particular, the condensate formed during the creaming method is mixed in, which further improves the utilization of the condensate for cooling the pre-product 33 and thus achieving the end product 38, but also contributes liquid (especially water) to the end product 38, which can be economized upon in the formula for obtaining the desired end product 38. In addition, since the condensate is reintroduced to the pre-product 33, flavor present in the condensate is retained in the method, which likewise results in savings in the formula for obtaining the desired end product 38.

Continuous units are normally operated at constant throughput. Depending on the production situation or in case of malfunctions (e.g., failure of a filling machine), however, the output must be adjusted appropriately, i.e., adjustment for changes in throughput is preferably performed. In the case of the invention, adjustment to different output ranges of production (e.g., 100 . . . 500 kg/h, 200 . . . 1000 kg/h, 400 . . . 2000 kg/h etc.) can be advantageously achieved via the size of the container 17 as a function of the creaming time and the heat exchange surface area of the double wall 44 or optionally of the cooling zones 53a, 53b or 53c and optionally additional cooling zones by way of the condenser surface area, i.e., the cooled or cold part of the wall 43 or the inner surfaces of the container 17.

Within each performance area, e.g., those indicated above as examples, the adjustment to different quantities of heat output to be removed can preferably be performed by switching off individual double jacket segments, particularly if desired the cooling zones 53a, 53b and/or 53c and optionally additional cooling zones, as well as the coolant temperature and flow volume, for example cooling water in the double jacket or in the double wall 44.

Regulation by switching off individual double jacket segments, particularly if desired individual cooling zones 53a, 53b and/or 53c and optionally additional cooling zones: first, a rough adjustment to different heat outputs within one of the power ranges mentioned above as examples is performed by implementation of the double jacket in several segments, particularly if desired individual cooling zones 53a, 53b and/or 53c and optionally additional cooling zones, and operating only individual or all segments, particularly if desired individual or multiple cooling zones 53a, 53b and/or 53c and optionally further cooling zones. Fine regulation can be accomplished by the additional control variants presented in the following.

Quantity control: In this case the quantity of the coolant flowing through, for example cooling water, and thus the transfer of heat from the condensing steam to the coolant, is adjusted using a control valve. If the production output and the temperature T in container 17 increase, the throughput of the cooling mediums, for example cooling water, is increased and thus the heat throughput is improved; in case of decreasing power and temperature T it is decreased.

Temperature regulation: Here, the temperature difference between condensing steam and coolant, for example cooling water, is varied by regulating the temperature of the coolant, for example cooling water, using a mixing valve. In the case of increasing production output and temperature T in container 17, the temperature of the coolant, for example cooling water, and thus the temperature difference mentioned is lowered by supplying cooling water, but it is raised in the case of decreasing output and temperature T in container 17.

For the sake of completeness it will also be noted that placing the container, creaming apparatus 9, stirrer 54 and components thereof as well as scraper 57, even if these designs are shown as combined in the second exemplary embodiment according to FIG. 2, need not necessarily only be used together in this combination, but instead each of these designs can be used in the scope of the present invention, independently of the other designs described and in particular, of all other designs in FIG. 2.

Also within the scope of the invention is a method for cooling high-heat-treated, particularly ultra-high-heat-treated food products based on the specified operation of the apparatus 1 for cooling high-heat-treated food products described above and claimed in the claims. In particular, a method for preferentially continuous cooling of high-heattreated, particularly ultra-high-heat-treated food products is characterized in that liquid evaporates from the pre-product 33 and the heat is removed by condensation on the inner wall of the container 17.

The invention is only presented by way of examples based on the execution examples in the description and in the drawing and is not limited to these, but includes all variations, modifications, substitutions and combinations that the person skilled in the art can derive from the present documents, particularly within the scope of the claims and the general presentations in the introduction to this description as well as the description and drawing of the execution examples and combine with his expert knowledge along with the prior art. In particular, all of the individual features and design possibilities of the execution examples can be combined with one another.

LIST OF SYMBOLS 1 apparatus for cooling high-heat-treated food products
2, 2' heat-treatment line
3a, 3b precooker
4, 4' buffering container
5, 5' evacuation pump
6, 6' heat-treatment system or -equipment or heat treatment
7a, 7b heat treatment section or module
8 flash cooler
9 creaming apparatus
10 filter station and filling devices
11, 11' raw materials
12 pre-product
13a, 13b ultra-high temperature head
14 pre-product
15 insufficiently sterilized components
16 residual material container
17 flash cooler container
18 vacuum cooling
19 end product
20 creaming device
21 premixer
22 pre-product
23 Continuous Cooker
24 pre-product
25 end product
26 vapor condenser
27 steam
28 heat exchanger or condenser
29 condensate
30 vacuum pump
31 coolant inlet line
32 coolant discharge line
33 pre-product
34 cylinder axis
35 perpendicular to the floor
36 bowl
37 outlet
38 end product
39 lid
40 inlet
41 cooling equipment
42 cooling jacket
43 wall
44 double wall
45, 45', 46 hollow space
47, 47', 48 inlet
49, 49', 50 outlet
51 coolant
52 steam
53a, b, c cooling zones
54 stirrer
55 stirring arm
56 drive
57 scraper
P product level
α angle

The invention claimed is:

1. An apparatus for cooling high-heat-treated food products with a flash cooler, having a container for a pre-product to be cooled with an inlet for the pre-product to be cooled and an outlet for a cooled end product of the food product as well as cooling equipment, wherein
said apparatus is adapted for continuous cooling of high-heat-treated food products,
the container having a bowl having the outlet for the cooled end product of the food product and a lid, to which the inlet of the pre-product to be cooled is associated,
wherein the cooling equipment is associated both to the bowl and the lid,
the cooling equipment has a cooling jacket associated to the container through which jacket at least one part of a wall of the container is cooled,
the cooling jacket is located or formed on the bowl and on the lid of the container,
wherein a longitudinal axis of the container is positioned at an acute angle (α) with the vertical such that the bowl provides for the lowest part of the container, and said outlet for the cooled end product of the food product is located a position lower than the center of the bowl, and
wherein the cooling equipment is configured to cool the pre-product and steam generated by the pre-product.

2. The apparatus according to claim 1, the cooling jacket being formed by a double wall of at least one part or on at least one part of the container or pillow plate.

3. The apparatus according to claim 1, wherein the cooling jacket contains at least two separately operable cooling zones.

4. The apparatus according to claim 1, wherein a creaming apparatus is located in the container.

5. A heat-treatment line for food products, containing the apparatus according to claim 1.

6. The heat-treatment line for food products according to claim 5, which is a continuous heat-treatment line.

7. A method for cooling high-heat-treated, particularly ultra-high-heat-treated food products, with a flash cooler, having a container for a pre-product to be cooled, with an inlet for the pre-product to be cooled and an outlet for a cooled end product of the food product as well as cooling equipment, wherein liquid evaporates from the pre-product and the heat is removed by condensation on an inner wall of the container,
continuously cooling high-heat-treated food products with the flash cooler,
providing the container with a bowl having the outlet for the cooled end product of the food product and a lid, to which the inlet of the pre-product to be cooled is associated,
providing the cooling equipment associated both to the bowl and the lid, the cooling equipment having a cooling jacket associated to the container through which jacket at least one part of a wall of the container is cooled, the cooling jacket located or formed on the bowl and on the lid of the container, and positioning a longitudinal axis of the container at an acute angle (α) with the vertical such that the bowl provides for the lowest part of the container, and said outlet for the cooled end product of the food product is located at a position lower than the center of the bowl, and cooling the pre-product and steam generated by the pre-product.

8. The method according to claim 7, wherein the cooling jacket contains at least two separately operable cooling zones.

9. The method according to claim 7, wherein a creaming apparatus is located in the container.

\* \* \* \* \*